(12) United States Patent
Harris (10) Patent No.: US 7,774,286 B1
(45) Date of Patent: Aug. 10, 2010

(54) GPSTP WITH MULTIPLE THREAD FUNCTIONALITY

(76) Inventor: Curtis L. Harris, 209 Dartmouth, SE., Albuquerque, NM (US) 87106

( * ) Notice: Subject to any disclaimer, the term of this patent is extended or adjusted under 35 U.S.C. 154(b) by 496 days.

(21) Appl. No.: 11/874,842

(22) Filed: Oct. 18, 2007

Related U.S. Application Data (60) Provisional application No. 60/862,726, filed on Oct. 24, 2006.

(51) Int. Cl.
*G06F 15/18* (2006.01)
*G06F 7/38* (2006.01)
*G06F 9/00* (2006.01)
*G06F 9/44* (2006.01)

(52) U.S. Cl. .................................. 706/12; 712/228
(58) Field of Classification Search .................. 706/62, 706/12; 712/228
See application file for complete search history.

(56) References Cited

U.S. PATENT DOCUMENTS

| | | | |
|---|---|---|---|
| 3,358,270 A | 12/1967 | Crew et al. | |
| 4,094,001 A | 6/1978 | Miller | |
| 4,451,901 A | 5/1984 | Wolfe et al. | |
| 4,531,201 A | 7/1985 | Skinner, Jr. | |
| 4,625,295 A | 11/1986 | Skinner | |
| 4,747,072 A | 5/1988 | Robinson et al. | |
| 4,760,523 A | 7/1988 | Yu et al. | |
| 5,051,947 A | 9/1991 | Messenger et al. | |
| 5,245,262 A * | 9/1993 | Moody et al. .............. | 318/560 |
| 5,437,050 A * | 7/1995 | Lamb et al. ................ | 725/22 |
| 5,469,549 A * | 11/1995 | Simpson et al. ............ | 709/213 |
| 7,392,229 B2 | 6/2008 | Harris et al. | |
| 2002/0032670 A1 | 3/2002 | Watanabe et al. | |
| 2002/0059152 A1 | 5/2002 | Carson et al. | |
| 2002/0125500 A1 | 9/2002 | Mattausch | |
| 2002/0168100 A1 | 11/2002 | Woodall | |
| 2003/0014240 A1 | 1/2003 | Navoni et al. | |
| 2003/0055799 A1 | 3/2003 | Starzyk | |
| 2003/0194124 A1 | 10/2003 | Suzuki et al. | |
| 2003/0229636 A1 | 12/2003 | Mattausch | |
| 2004/0080973 A1 | 4/2004 | Ogura | |
| 2004/0123071 A1 | 6/2004 | Stefan et al. | |
| 2004/0156546 A1 | 8/2004 | Kloth | |
| 2005/0049984 A1 | 3/2005 | King | |
| 2005/0154802 A1 | 7/2005 | Kravec et al. | |
| 2005/0257025 A1 | 11/2005 | Spencer | |

OTHER PUBLICATIONS

Raghavendra, Vijay and Chidchanok Lursinsap "A Technique for Micro Rollback Self Recovery Synthesis" IEEE Transactions on COmputer-Aided Design of Integrated circuit san Systems vol. 14, No. 9, Sep. 1995.p. 1171-1179.*

(Continued)

*Primary Examiner*—Donald Sparks
*Assistant Examiner*—Ben M Rifkin
(74) *Attorney, Agent, or Firm*—Townsend and Townsend and Crew LLP; Kenneth R. Allen (57) ABSTRACT

Multiple thread functionality in a general purpose set theoretic processor (GPSTP) is implemented by addition of a thread memory for processing multiple interleaved data input streams to enable state save-and-restore functionality. The thread memory is functionally distributed among three parts of the GPSTP that change state during execution. The system structure minimizes the number of bits required to be saved and restored, and cell structures are configured implement the multi-thread functionality.

7 Claims, 5 Drawing Sheets

OTHER PUBLICATIONS

Genov, et al., "Kerneltron: Support Vector Machine" in Silicon, IEEE Transactions on Neural Networks, vol. 14, No. 5 (Sep. 2003), pp. 1426-1433.

Genov, et al., "Silicon Support Vector Machine with On-Line Learning," International Journal of Pattern Recognition, vol. 17, No. 3, World Scientific Publishing Company (2003), pp. 385-404.

Hasan et al., "A VLSI BAM Neural Network Chip for Pattern Recognition Applications," 1995 IEEE International Conference on Neural Networks Proceedings, IEEE, Part vol. 1, New York, NY (1995), pp. 164-168.

Kurogi, et al., "Multilayered and Columnar Competitive Networks for Spoken Word Recognition," Proceedings of the 19$^{th}$ International Conference on Neural Information Processing (ICONIP'02), vol. 5, Wang, et al., Editors (2002), pp. 2223-2227.

Matshubishi, et al., "A Vector Digital Signal Processor LSI for Speaker-Independent Voice Pattern Matching," IEEE 1991 Custom Integrated Circuits Conference (1991), pp. 16.4.1-14.4.4.

Ogawa, et al., "A General-Purpose Vector-Quantization Processor Employing Two-Dimensional Bit-Propagating Winner-Take-All," 2002 Symposium on VLSI Circuits, Digest of Technical Papers, IEEE, Piscataway, NJ (2002), pp. 244-247.

Stormon, "The Coherent Processor TM an Associative Processor Architecture and Applications," COMPCON Spring'91, Digest of Papers, IEEE Cput. Soc. Press, Los Alamitos, CA (1991), pp. 270-275.

Tsai, et al., "Optimal Speed-Up Parallel Image Template Matching Algorithms on Processor Arrays with a Reconfigurable Bus System," Computer Vision and Image Understanding, vol. 71, No. 3 (1998), pp. 393-412.

Yamashita, et al., "An Integrated Memory Array Processor with a Synchronous-DRAM Interface for Real-Time Vision Applications," Proceedings of the 13$^{th}$ International Conference on Pattern Recognition, IEEE Comput. Soc. Press, Part vol. 4, Los Alamitos, CA (1996), pp. 575-580.

\* cited by examiner

GPSTP WITH MULTIPLE THREAD FUNCTIONALITY

CROSS-REFERENCES TO RELATED APPLICATIONS

The present application claims benefit under 35 USC 119(e) of U.S. provisional Application No. 60/862,726, filed on Oct. 24, 1007, entitled "MULTIPLE THREAD FUNCTIONALITY," the content of which is incorporated herein by reference in its entirety.

The present application is related to and incorporates the contents of the following US application by reference in its entirety and which is not to be considered to be prior art: U.S. application Ser. No. 11/353,318, entitled "General Purpose Set Theoretic Processor", filed Feb. 13, 2006.

BACKGROUND OF THE INVENTION

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

This invention relates to improvements in a general purpose set theoretic processor (GPSTP). A GPSTP is a systolic (i.e., stimulus-response) processor consisting of N building block modules (BBMs), each of which is itself a systolic processor, as explained elsewhere. Each BBM has a recognition network and an aggregation network. The aggregation network as described in the related patent application Ser. No. 11/353,318 has two components of interest, an aggregation routing matrix and a threshold logic unit. The recognition network and the aggregation network are controlled by an external stimulus-response sequencer, also as explained elsewhere. In scan mode, the recognition network generates a 1024 bit response for every input stimulus-byte.

The prior GPSTP has certain limitations that inhibit its versatility. In certain modes of operation, a GPSTP must receive inputs (messages, documents) from data streams as segmented threads such that several segments must be assembled to form a whole thread. Such data streams are generated by a plurality of sources and multiplexed so that segments belonging to different entities are interleaved. Thus, there is a need to scan segments from a plurality of sources and to save the GPSTP state for each source while scanning segments from other sources and restoring the GPSTP state for a source when its next segment is scanned. The speed requirements for applications such as those in the above scenario make preserving state external to the GPSTP prohibitive.

The prior GPSTP occupied all of the space available on the highest capacity contemporary integrated circuit (IC) medium. The nature of the GPSTP concept demands total capacity from implementation media, requiring relatively large amounts of memory. So some means must be found to reduce the implementation resource required by the GPSTP while maintaining its capacity, functionality and speed. What is needed are improvements that address those limitations.

BRIEF SUMMARY OF THE INVENTION

According to the present invention, an improvement is provided for processing multiple interleaved data input streams in a general purpose set theoretic processor, wherein a thread memory is provided to enable state save-and-restore functionality. The thread memory is functionally distributed among three parts of the GPSTP that change state during execution.

In order to provide resources for thread memory of a GPSTP, one of the major components of the GPSTP is reorganized, reducing by two-thirds the number of memory bits and by one-half the number of logic gates it uses as compared to prior embodiments. This reorganization also results in more flexible and efficient use of the remaining resources.

Specifically according to the invention, a new sub-system is added to a GPSTP in order to minimize the number of bits required to be saved and restored, thereby making the throughput performance of the GPSTP comensurate with the prior GPSTP. A number of cell structures are modified to implement the multi-thread functionality.

The invention will be better understood upon reference to the following detailed description in connection with the accompanying drawings.

DETAILED DESCRIPTION OF THE INVENTION

Figure 1:
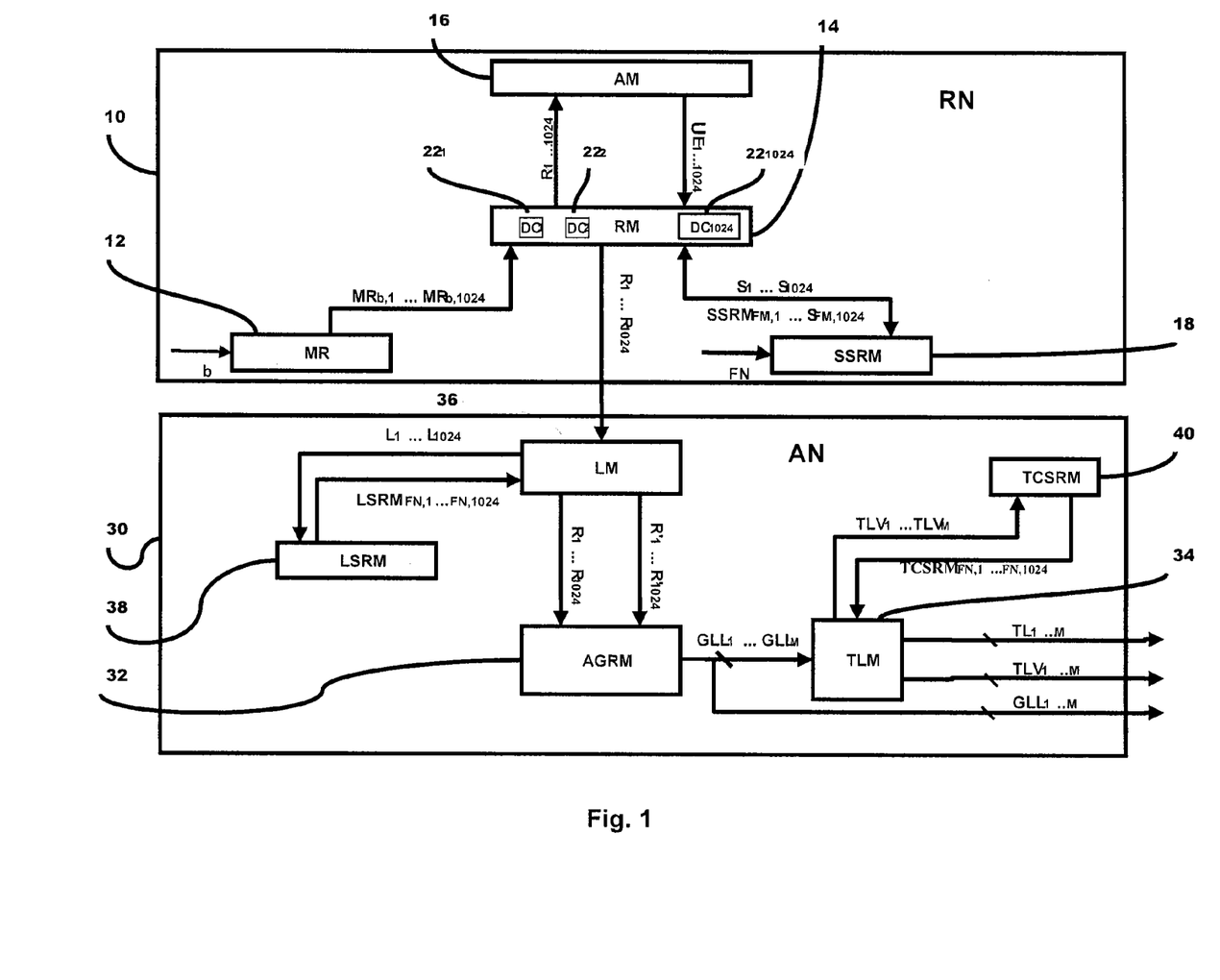
FIG. 1 is a block diagram of a general purpose set theoretic processor according to the invention.

Referring to FIG. 1, a general purpose set theoretic processor has a recognition network 10 with a latent response memory (MR) 12, coupled via a recognition matrix (RM) 14, to an activity matrix (AM) 16, and at least one state save and restore memory (SSRM) 18 coupled to the recognition matrix 14. As hereinafter explained, the SSRM 18 is one of three such added to implement the functions necessary for dealing with multiple threaded sources.

The latent response memory (MR) 12 is a 256×1024 random access memory. Each of its columns $MR_i$ is connected to a detection cell $DC_i$. $22_i$ of the recognition matrix (RM) 14. Each of its rows $MR_r$ is loaded with the latent response specified by the current reference pattern to the stimulus-byte whose digital value is equal to the row number. On each input cycle, $MR_b$ (the row whose number is equal to the input stimulus-byte) is conjunctively combined with the state of the recognition matrix (RM) 14 to produce a manifest response; each of its bits MRb,i is ANDed with the state of the corresponding detection cell $DC_i$ to generate response $R_i$, which is one bit of the manifest response.

The principal goal of the present invention is to provide a multiple thread capability in the GPSTP without diminishing capacity (i.e., number of detection cells 22i), the functionality or the throughput speed of the GPSTP. Modification of the latent response memory (MR) 12 (FIG. 1) to use one column of 256 bits per detection cell instead of three such columns releases large numbers of memory cells to be used elsewhere, such as for the save and restore memory (SSRM) 18 (FIG. 1), the latch save and restore memory (LSRM) 38 (FIG. 1) and the threshold count save and restore memory. (TCSRM) 40 (FIG. 1). In the prior GPSTP, three 256-bit columns of memory were required to store latent responses for each detection cell, one column each for auto-activation, for activation of other detection cells and for transmitting results to the aggregation network. Since it is rare that any detection cell requires more than one of these functions, and since in most cases where two functions are required (e.g., auto-activation and activation of other detection cells), it has been recognized that all of the same response bits can be used for both purposes, for most cases a single memory column can be used. This modification requires changes to the detection cell (DC) 22 (FIG. 2) and the activation routing cell 24 (FIG. 3), as well as to the latent response memory 12 (FIG. 1) itself.

The save and restore memory (SSRM) 18 is typically a 256×1024-bit memory. When a source appears in the interleaved stimulus stream other than that being processed, the current recognition matrix state $S=S_1, S_2, \ldots, S_{1024}$ is stored at row $SSRM_{FN}$ (FN being the source or flow number). When the interrupted flow resumes, the current state for the in process flow is saved to $SSRM_{FN}$, and the contents of $SSRM_{FN}$ are retrieved and used to restore the state of the recognition matrix 14. When an input block (e.g., a message) is complete, its final state is not saved, and the row in SSRM 18 that its saved state had occupied is released. Flow number management is performed in software external to the GPSTP.

According to present invention, only one MR column of 256 bits is used for each detection cell (DC) $22_i$, providing a mechanism for linking detection cells in those cases when more than one of the three functions is needed for recognizing simplex stimuli. They are linked by means of activity routing cells $(ARC_i)$ $24_{j,i}$ (FIG. 4) in the activity matrix 24 (FIG. 1) in the recognition network 10 (FIG. 1). In the prior GPSTP, there was the mapping $DC_p \rightarrow DC_s$ (predecessor $DC_p$ activates successor $DC_s$) and the $DC_s$ is configured to respond with all three functions.

Figure 4:
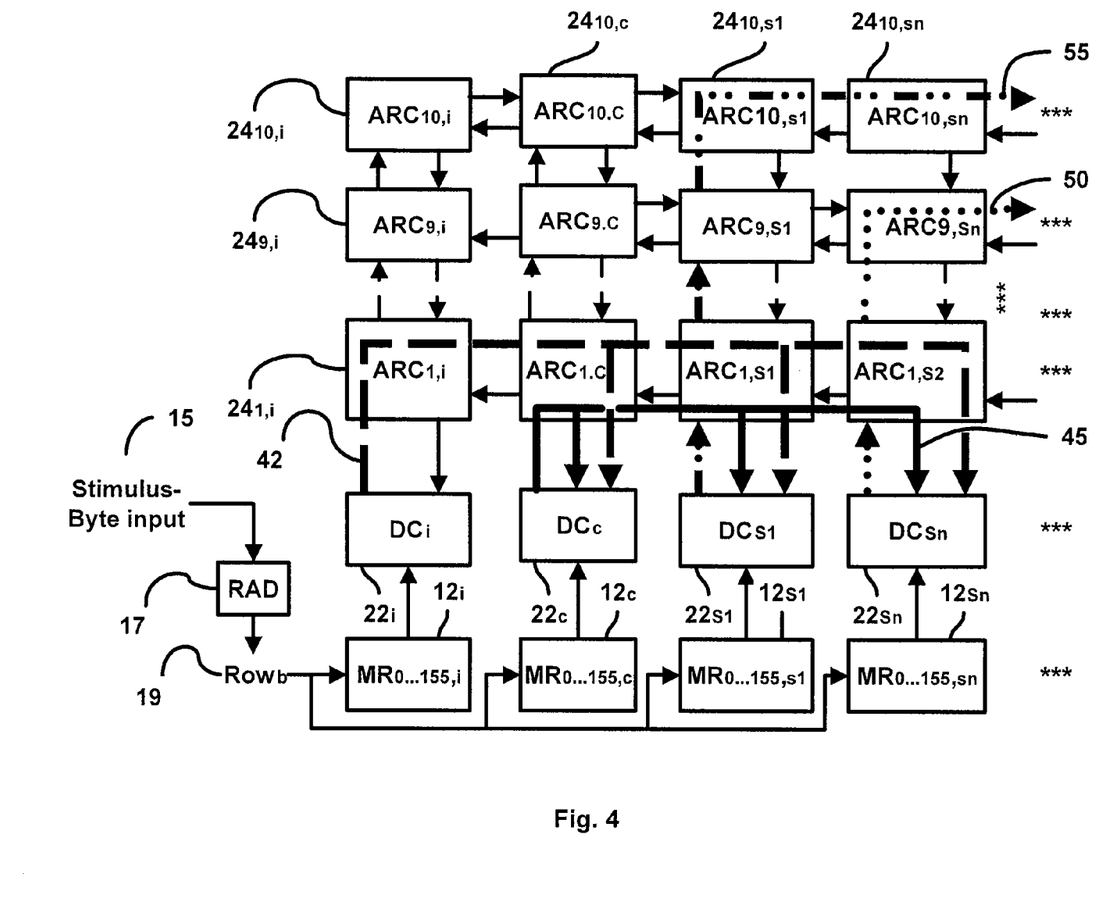
FIG. 4 is a block diagram of a portion of a recognition network illustrating reconfigurable synchronization configuration according to with the invention.

Referring to FIG. 4, in the GPSTP 10 modified according to the present invention DCi $22_i \rightarrow$ DCc $22_c$ (read, "DCi and activates DCc"), DCi→$DC_{s1}$ $22_{s1}$, DCi→$DC_{s2}$ $22_{s2\ c}$, and $DC_c \rightarrow DC_{s1}$, $DC_c \rightarrow DC_{s2}$. The detection cell c $DC_c$ is configured (via activity routing cell $ARC_{1,c}$ $24_{1,c}$) to auto-activate whenever it is active, and its latent response to stimulus-byte b at input 15 is $MR_{b,c}$ $12_i=1$. $DC_{s1}$ is configured by $ARC_{1,c} \geq 1_{,c}$ and $ARC_{1,s1} \geq 1_{,s1}$, and $DC_{s2}$ is configured by $ARC_{1,c}$, $ARC_{1,s1}$, and $ARC_{1,s2}$ $24_{1,s2}$ to activate under the same conditions as $DC_c$. Further, $DC_{s1}$ and $DC_{s2}$ are configured to activate detection cells elsewhere in the recognition matrix. This linkage assures that the linked cells are always in the same state, thus assuring that the linked cells perform exactly as a single detection cell using three columns of memory as in the prior GPSTP.

The types of linkage paths are illustrated in FIG. 4. The bold dashed line represents the ARC configuration that enables $DC_i$ $22_i$ to initiate synchronization of $DC_c$ $22_c$ with $DC_{s1}$ $22_{s1}$ and $DC_{s2}$ $22_{s2}$. The bold solid line represents the ARC configuration that enables $DC_c$ to synchronize the states of $DC_{s1}$ and $DC_{s2}$ with its own state. The bold dotted line represents an ARC configuration that enables $DC_{s1}$ to activate one or more detection cells elsewhere in the recognition matrix. The bold dashed and dotted line represents an ARC configuration that enable $DC_{s2}$s to activate one or more detection cells elsewhere in the recognition matrix (RM) 14.

The recognition matrix (RM) 14 is a 1×1024 set of detection cells $DC_i$. $22_i$. In the prior GPSTP, each $DC_i$. $22_i$ was connected to its immediate physical neighbor. According to the present invention, these cells have no direct connections among themselves and, except for physical proximity, they have no inherent order. The present invention connects detection cells via the activity matrix(AM) 16 according to the currently loaded reference pattern. Detection cells 22 of the present invention have a further input and further output in addition to those inputs and outputs found in the prior GPSTP.

The following transition functions are to be noted:

$SSRM_{FM,i}$ The state of $DC_i$ is restored with value input from $SSRM_{FM,i}$ $S_i$ The current state of $DC_i$ is output to $SSRM_{FM,i}$ for preservation.

Detection cells are subject to two additional controls:

SAV SAV is used to preserve state values of the recognition matrix RM, the latch matrix LM and the counts of the threshold logic cells in the aggregation network (AN) 30.

RES RES recalls saves states and restores the GPSTP with them.

As with the prior GPSTP, the state $S_i$ is the state of detection cell $DC_i$. $22_i$. State $S_i=1 \equiv$Active $S_i 0 \equiv$Inactive.

Figure 2:
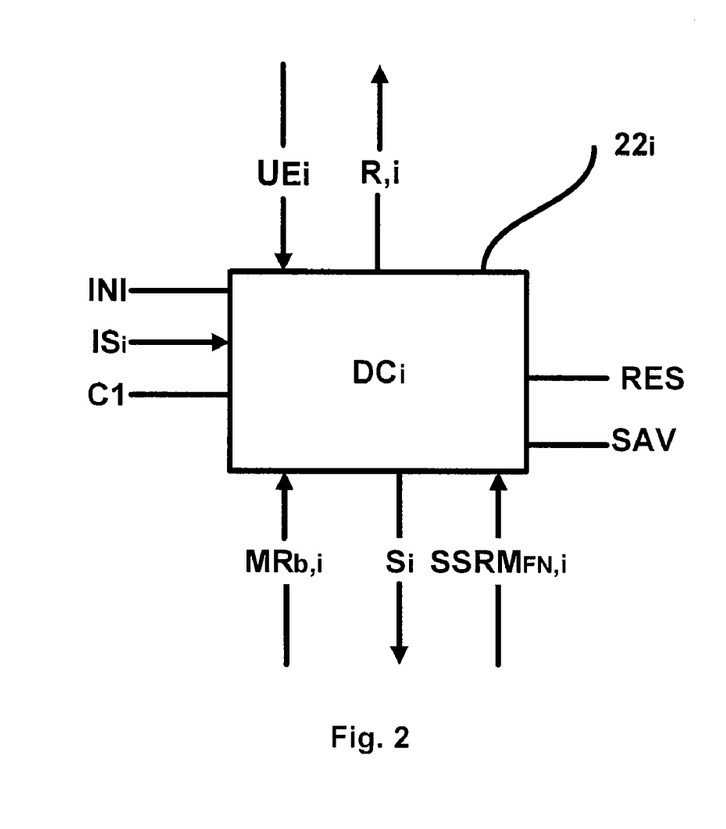
FIG. 2 is a block diagram of a detection cell according to the invention.

Referring to FIG. 2, the detection cell 22 itself has been simplified by removal of the auto-activation to the Activity Matrix 24. The following are the cell's inputs, outputs, and logic equations.

Inputs:

$IS_i$ Initial state for $DC_1$ $MR_{b,i}$ Latent Response for stimulus-byte b and $DC_i$ $UE_{j,i}$ Union of all signals in the Activation Matrix directed to activating $DC_i$ $SSRM_{FN,i}$ The restoration state for $DC_i$ and source (flow) number FN.

Outputs:

$S_i$ The current State of DCi output to $SSRM_{FN,i}$ $R_i$ Manifest Response output to Latch Cell $LC_i$ and to Activity Routing Cells $ARC_{1,i}$ thru $ARC_{10,i}$ Manifest Response:

$$Ri \leftarrow C1 \ \& \ S_i \ \& \ MR_{b,i}$$

Initiate State:

$$S_i \leftarrow INI \ \& \ IS_i$$

Next State:

$$S_i \leftarrow C2 \ \& \ UE_{j,i}$$

Restore Detection Cell State:

$$S_i \leftarrow RES \ \& \ SSRM_{FN,j}$$

Save Detection Cell State:

$$SSRM_{FN,j} \leftarrow S_i \ \& \ SAV$$

Referring again to FIG. 1, the activity matrix (AM) 16 is a rectangular array of potential pathways that can be used to connect the manifest response $R_i$ of any detection cell $(DC_i)$ $22_i$ to any set of detection cells. In the prior GPSTP, a detection cell could be configured to auto-activate on specified conditions. The present invention modifies the AM 16 so that a DC 22 can be connected to itself, as well as to any other detection cell. This modification removes the auto-activation function from the detection cell to the activity matrix, simplifying the DC. A reference pattern configures the AM 16 into a network of actual connections that allow a first DC 22 to activate other detection cells (including itself) for the next stimulus-byte input. If the DC 22 is not activated by itself or another detection cell, it is inactive for the next input cycle.

Figure 3:
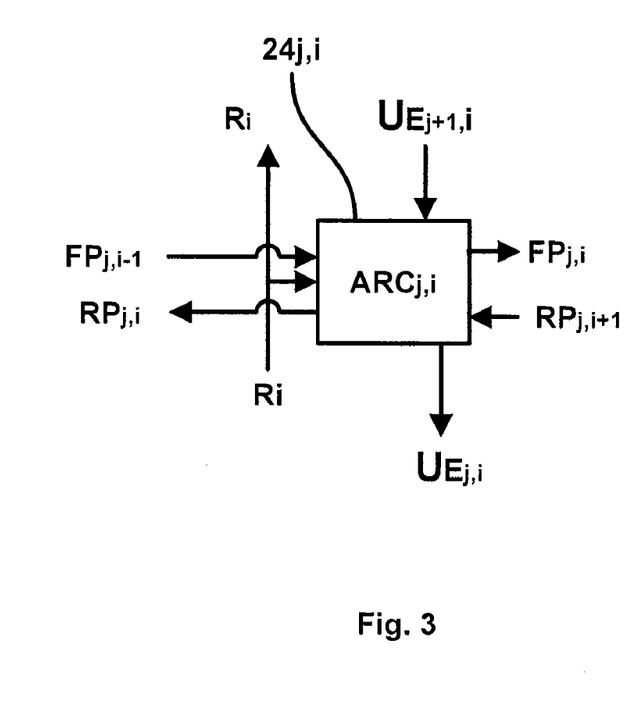
FIG. 3 is a block diagram of an activity routing cell illustrating specific inputs according to the invention.

The AM 16 accrues no new inputs or outputs as a consequence of operation according to the present invention. Referring to FIG. 3, there is however one modification to the activity response cells ($ARC_{j,i}$) $24_{j,i}$, namely, one additional connection in its internal logic. The AM 16 is a pure passive interconnection network which does not change between reference pattern loads. Thus it is not subject to any execution controls.

Its modification can be seen in a change to one logic equation. The equations for the Unified Enable output are:

Compare prior: $UE_{j,i} \leftarrow UE_{j+,i} V(AFP_{j-1,i}$ & $FP_{j-1,i})V(ARP_{j-1,i}$ & $RP_{j+1,i}))$ Present: $UE_{j,i} \leftarrow UE_{j+,i} V(AFP_{j-1,i}$ & $FP_{j-1,i}) V ((ARP_{j-1,i}$ & $(R_i$ & $SRP_{j,i})) V (RPS_{j,i}$ & $RP_{j+1,i}))$ Where:
  $ARP_{j,i} \equiv$ Accept Reverse Propagation—incorporate the activation signal from $ARC_{j,i+1}$ into $UE_{j,i}$
  $RP_{j,i+1} \equiv$ Reverse Propagation—Activation signal from $ARC_{j,i+1}$
  $UE_{j+,i} \equiv$ Union of activation signals from $ARC_{10,i}$ thru $ARC_{j+2,i}$ and all the activation signals routed through them
  $R_i \equiv$ Manifest Response from $DC_i$
  $SRP_{j,i} \equiv$ Select Reverse Propagation—incorporate $R_i$ activation signals routed from $ARC_{j,i+1}$ through $ARC_{j,i}$ into $RP_{j,i}$
  $RPS_{j,i} \equiv$ Reverse propagation switch—pass activation signals from $ARC_{j,i+1}$ Through $ARC_{j,i}$ to $ARC_{j,i-1}$ This embodiment incorporates the Manifest Response $R_i$ into the activation (aka activity) signal fed into $DC_i$, thereby enabling auto-activation through the AM 16 without auto-activation circuitry within each $DC_i$.

The remaining ARC 24 equations are:

Forward Propagation $FP_{j,i} \leftarrow (Ri$ & $SFP_{j,i})V (FPS_{j,i}$ & $FP_{j-1,i})$ Reverse Propagation:

$RP_{j,i} \leftarrow (Ri$ & $SRP_{j,i})V (RPS_{j,i}$ & $RP_{j+1,i})$

The second major component of the GPSTP, an aggregation network (AN) 30 (FIG. 1) has two major components: an aggregation routing matrix (AGRM) 32 and a threshold logic matrix(TLM) 34. The RM/AGRM interface is a unidirectional connection of 1024 bits through latch matrix 36. This connection brings the RM 14 manifest response to the AGRM 32 on every stimulus-byte input cycle. Internally, connections in the aggregation network 30 are all M-bit unidirectional, as shown.

The AGRM 32 maps selected detection cells 22 to one or more threshold logic cells ($TLC_j$) $34_j$. The TLCs $34_j$ determine when satisfaction of conditions mapped to it is sufficient.

Referring to FIG. 1, according to the present invention, three more components are added, a latch matrix (LM) 36, a latch state save and restore memory (LSSRM) 38, and a threshold state save and restore memory (TCSRM) 40.

Figure 5:
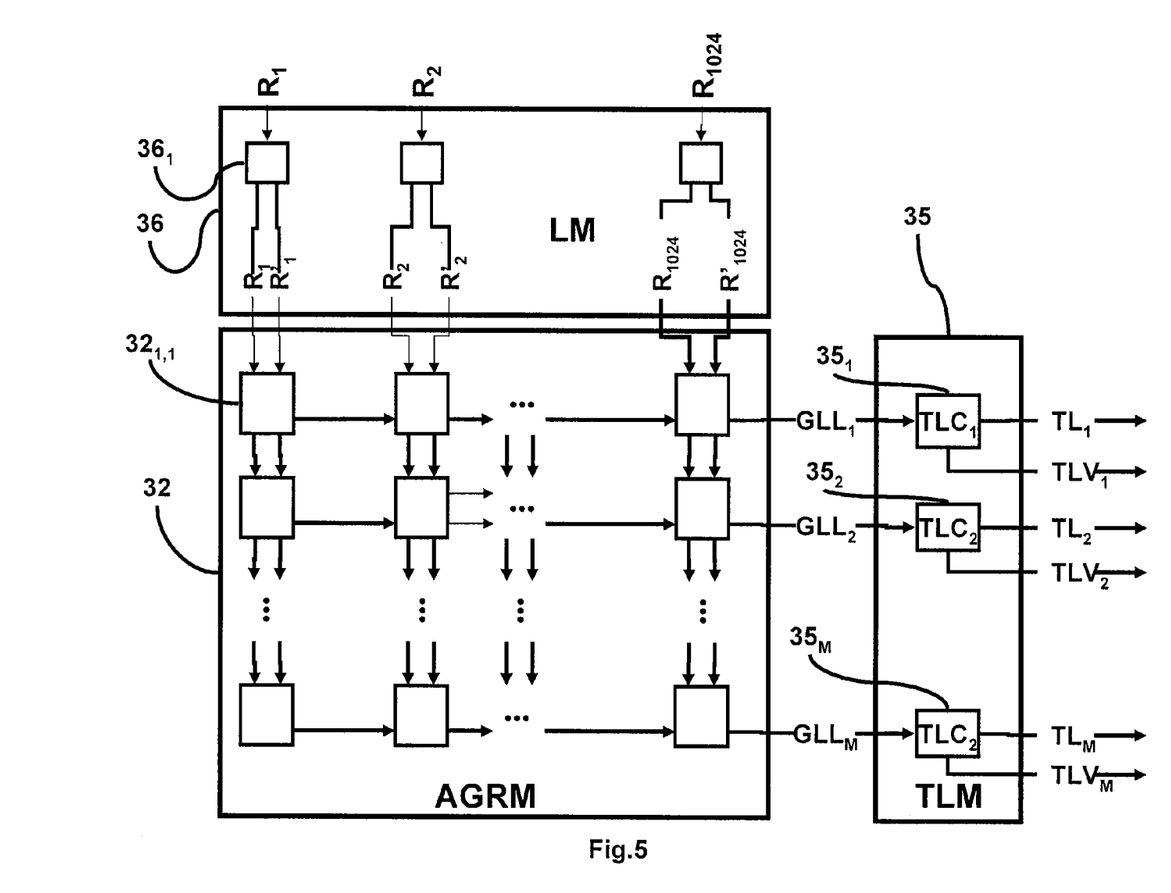
FIG. 5 is a block diagram of selected details of a latch matrix, aggregation matrix and a threshold logic matrix of the aggregation network of FIG. 1.

Referring to FIG. 5, the LM 36 comprises a 1×1024 array of latch cells ($LC_i$) $36_i$, one $LC_i$ $36_i$ for each $DC_i$ 22. The LSSRM 38 (FIG. 1) is a 256×1024 random access memory. The latch matrix state ($L_1 \ldots L_{1024}$) is saved to and restored from LSSRM 38 in the same manner as the recognition matrix 14 (FIG. 1) is saved to and restored from the SSRM 18.

Figure 6:
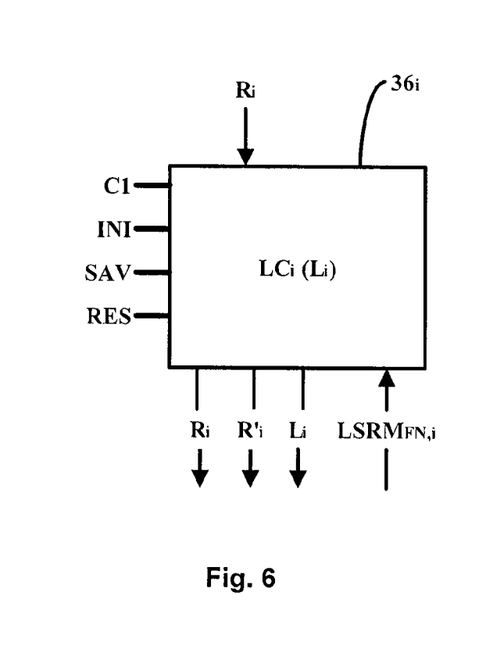
FIG. 6 is a block diagram showing preferred inputs and outputs of a latch cell of a latch matrix.
Figure 7:
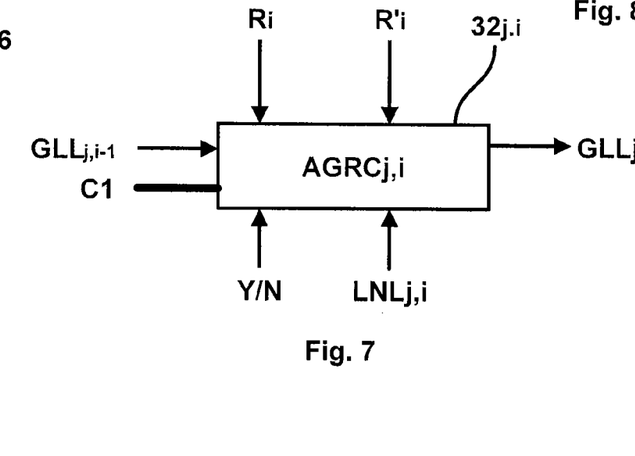
FIG. 7 is a block diagram showing preferred inputs and outputs of an aggregation routing cell.

On each stimulus-byte input, the selected LCi (FIG. 6) accepts the manifest response Ri from DCi. It passes every $R_i=1$ through to the $i^{th}$ row of aggregation routing cells $AGRC_{1,i} \ldots AGRC_{m,i}, 32_{1,i} \ldots 32_{M,i}$ (FIG. 7). It sends $R'_i=1$ to $AGRC_{1,i} \ldots AGRC_{M,i}, 32_{1,i} \ldots 32_{M,i}$ only on the first occurrence of $R_i=1$, thereafter it sends $R'_i=0$. until it is reset either by load of a new reference pattern or by restoration from $TCSRM_{FN,i} 40_{FN,I}$.

LC equations are given as follows:

Initialize $L_i \leftarrow 1$

First Recognition:

$R'_i \leftarrow C1$ & $R_i$ & $L_i$

Latch State:

$L_i \leftarrow L_i V ((C1$ & $R_i) V INI)$ &
    $((C1$ & $\sim R_i) V INI V (RES V LSRM_{FN,j}))$ Save Latch State:

$LSRM_{FN,j} \leftarrow L_i$ & SAV

Restore Latch State:

$L_i \leftarrow RES$ & $LSRM_{FN,j}$

The aggregation routing matrix (AGRM) 32 (FIG. 5) is an M×1024 array of aggregation routing cells ($AGRC_{M,i}$) $32_{M,i}$. $AGRC_{M,i}$s are used to route manifest response outputs from detection cells that are the last in a term (set of interconnected DCs 22 meant to recognize equivalent input stimuli).

Each Y/N switch of $AGRC_{M,i}$ $32_{M,i}$ is set by the current reference pattern and does not change until a different reference pattern is loaded. The state $Y/N_{j,i}$ determines whether a particular $R_i$ (or $R'_i$) is routed to $TLC_j$ $34_j$. The latch/no-latch switch signal $LNL_{j,i}$ is likewise set by the reference pattern and not changed until another is loaded. This switch determines whether Ri or R'i is routed. The AGRC 32 has no state that can change during scan execution. Once the switches are set, the AGRM 32 is a passive routing matrix, a set of static connections. Therefore it has nothing that needs to be saved and restored on change of source.

Figure 8:
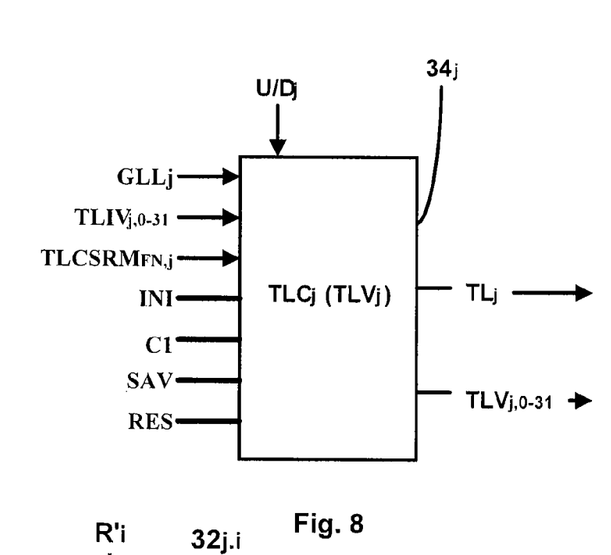
FIG. 8 is a block diagram showing preferred inputs and outputs of a threshold logic cell.

The threshold logic matrix (TLM) 35 (FIG. 5) is a linear array of M×1 36-bit threshold logic counters (TLC) $35_i$ (FIG. 8). The value of the TLCs $35_i$ is the third element of the GPSTP state and must be saved and restored at change of source.

The TCSRM 40 is a 256×1024 random access memory. The values of the TLCs $35_i$ [($TLV_{1,1} \ldots L_{1, 1024}$), ($TL_{2,1} \ldots L_{2, 1024}$) $\ldots$ ($TL_{32, 1} \ldots L_{32, 1024}$)] are saved to $TCSRM_{FN,1} \ldots 32$; $TCSRM_{FN,33} \ldots 64$; $\cdots$ $TCSRM_{FN,992 \ldots 1024}$ and restored therefrom.

The invention has now been explained with reference to specific embodiments. Other embodiments are evident to those of ordinary skill in the art. It is therefore not intended that this invention be limited, except as indicated by the appended claims.

What is claimed is:

1. A general purpose set theoretic processor having a recognition matrix with a plurality of detection cells, said detection cells being coupled to receive output of a latent response memory, the improvement comprising:
   a latch matrix coupled said recognition matrix;
   a latch state save and restore memory coupled to said latch matrix, said latch state save and restore memory for retaining state of said latch matrix;
   an activity matrix with a plurality of activity cells coupled to said plurality of detection cells;
   said detection cells apply detection output to said activity matrix;
   and wherein connection among said activity cells and among said detection cells is effected only through said activity matrix.

2. The general purpose set theoretic processor according to claim 1 further including a threshold logic matrix, the improvement comprising:
   a threshold count save and restore memory coupled to said threshold logic matrix, said threshold count save and restore memory for retaining state of said threshold logic matrix.

3. The general purpose set theoretic processor according to claim 1 further including a threshold logic matrix, the improvement comprising:
   a state save and restore memory coupled to said recognition matrix, said state save and restore memory for retaining state of said recognition logic matrix.

4. A general purpose set theoretic processor having a recognition matrix with a plurality of detection cells, said detection cells being coupled to receive output of a latent response memory the improvement comprising:
   an activity matrix with a plurality of activity cells coupled to said plurality of detection cells;
   and wherein connection among said activity cells and among said detection cells is effected only through said activity matrix.

5. The general purpose set theoretic processor according to claim 4, the improvement wherein the activity matrix is operative to enable any said detection cells to be connected to itself such that said detection cell may be auto activated in response to operation of said activity matrix.

6. The general purpose set theoretic processor according to claim 5, wherein each activity routing cell of said activity matrix is operative according to the following logic:

$$UE_{j,i} \leftarrow UV_{j+,i} \vee (AFP_{j-1,i} \& FP_{j-1,i}) \vee ((ARP_{j-1,i} \& (R_i \& SRP_{j,i})) \vee (RPS_{j,i} \& RP_{j+1,i}))$$

where:
   $ARP_{j,i}$=Accept Reverse Propagation—incorporate the activation signal from $ARC_{j,i+1}$ into $UE_{j,i}$
   $RP_{j,i+1}$=Reverse Propagation—Activation signal from $ARC_{j,i+1}$
   $UE_{j+,i}$=Union of activation signals from $ARC_{10,i}$ thru $ARC_{j+2,i}$ and all the activation signals routed through them
   $R_i$=Manifest response from $DC_i$
   $SRP_{j,i}$=Select Reverse Propagation—incorporate $R_i$ activation signals routed from $ARC_{j,i+1}$ through $ARC_{j,i}$ into $RP_{j,i}$
   $RPS_{j,i}$=Reverse propagation switch—pass activation signals from $ARC_{j,i+1}$ Through $ARC_{j,i}$ to $ARC_{j,i-1}$.

7. The general purpose set theoretic processor according to claim 5, the improvement further comprising:
   a single column of bits of said latent response memory, said single column being disposed for providing latent response input bits to only a single one of said detection cell in response to each input stimulus byte; and
   a configurable linkage via activity routing cells, said configurable linkage providing coupling between a first detection cell and a set of second detection cells, including a controlling detection cell and a plurality of synchronized detection cells, said first detection cell operative to initiate synchronization of said set, said controlling detection cell operative to synchronize its state with said synchronized detection cells in said set such that states of said synchronized detection cells are at the same state as the state of said controlling detection cell.

* * * * *